United States Patent
Käser et al.

(10) Patent No.: US 7,527,657 B2
(45) Date of Patent: May 5, 2009

(54) LIQUID PREPARATION OF A COPPER PHTHALOCYANINE DYE

(75) Inventors: Adolf Käser, Bottmingen (CH); Charles Hunger, Ettingen (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 519 days.

(21) Appl. No.: 10/542,852

(22) PCT Filed: Jan. 20, 2004

(86) PCT No.: PCT/EP2004/000424

§ 371 (c)(1),
(2), (4) Date: Jul. 21, 2005

(87) PCT Pub. No.: WO2004/067641

PCT Pub. Date: Aug. 12, 2004

(65) Prior Publication Data

US 2006/0080793 A1    Apr. 20, 2006

(30) Foreign Application Priority Data

Jan. 29, 2003  (EP)  .................. 03405042

(51) Int. Cl.
*C09B 47/04*  (2006.01)
*D21H 23/04*  (2006.01)

(52) U.S. Cl. .................. 8/661; 8/564; 8/594; 8/919

(58) Field of Classification Search .................. 8/680, 8/685, 661, 564, 594, 919
See application file for complete search history.

(56) References Cited

U.S. PATENT DOCUMENTS

| 4,111,650 | A | * | 9/1978 | Lacroix et al. .................. 8/527 |
| 4,780,104 | A |   | 10/1988 | Yamauchi et al. .............. 8/527 |
| 4,834,771 | A |   | 5/1989 | Yamauchi et al. .............. 8/527 |
| 5,489,330 | A | * | 2/1996 | Wunderlich .............. 106/31.46 |
| 5,665,871 | A | * | 9/1997 | Pedrazzi ..................... 534/573 |

FOREIGN PATENT DOCUMENTS

| EP | 0234573 | 9/1987 |
| EP | 0237586 | 9/1987 |
| GB | 1202536 | 8/1970 |
| JP | 06 057653 | 6/1994 |

OTHER PUBLICATIONS

Patent Abstracts of Japan, vol. 018, No. 296 (C-1209) of Pub. No. 06057653(1994).

* cited by examiner

*Primary Examiner*—Lorna M Douyon
*Assistant Examiner*—Amina Khan
(74) *Attorney, Agent, or Firm*—Tyler A. Stevenson

(57) ABSTRACT

A liquid preparation of a paper dye comprising a) 15 to 50% by weight of the dye of the formula $CuPc[SO_2NH(CH_2)_3N(CH_3)_2]_{2\,to\,3}[SO_3H]_{1\,to\,2}$ (1), in which CuPc represents copper phthalocyanine, or the alkali metal salt of (1), b) 5 to 15% by weight of $\in$-caprolactam, c) 1 to 8% by weight of formic acid, d) 1 to 7% by weight of benzyl alcohol, e) 0 to 3% by weight of a lower aliphatic organic acid, f) 0 to 5% by weight of an inorganic salt and g) water, to complete to 100% by weight, a process for the production of said preparation and the use thereof for dyeing, in particular dyeing of paper.

5 Claims, No Drawings

LIQUID PREPARATION OF A COPPER PHTHALOCYANINE DYE

The present invention relates to a liquid preparation of a copper phthalocyanine dye, to a process for the production of said preparation and to the use thereof for dyeing, in particular dyeing of paper.

In recent years, the use of concentrated aqueous solutions of dyes has gained importance, especially for the dyeing of paper, due to the advantages possessed by such solutions when compared with dyes in powder form. Thus, for example, the use of solutions avoids the difficulties associated with dust formation and releases the user from the time-consuming and frequently difficult dissolving of the dye powder in water. The use of concentrated solutions was also prompted by the development of continuous dyeing processes, since it is convenient in these processes to meter the solution directly into the pulp stream or to add it at some other suitable point during the papermaking process. However, such solutions should be ecologically and toxicologically acceptable, stable on storage, also in concentrated form and be readily pumpable, even at relatively low temperatures.

One attempt to solve this problem has been disclosed in U.S. Pat. No 4,111,650, whereby C.I. Basic Blue 100 is formulated as a stable concentrated solution by employing N-methyl pyrrolidone together with benzyl alcohol and a lower aliphatic carboxylic acid. However, the use of N-methyl pyrrolidone may be considered as disadvantageous from the ecological and toxicological viewpoints, since such dipolar aprotic solvents readily penetrate through the skin.

Surprisingly, it has now been found that the use of $\epsilon$-caprolactam instead of N-methyl pyrrolidone as a formulating aid enables the preparation of stable, concentrated aqueous preparations of C.I. Basic Blue 100, despite the fact that the dielectric constant of $\epsilon$-capro-lactam lies considerably lower than that of N-methyl pyrrolidone. The resulting solutions are both stable on storage and readily pumpable, exhibiting a viscosity below 150 mPa·s/5°, largely independent of the salt content of the dye press-cake employed. Consequently, a further advantage of the invention is that the dye press-cake need not be specially washed or desalted prior to formulation.

Accordingly, the present invention relates to a liquid preparation of a paper dye comprising a) 15 to 50% by weight of the dye of the formula

$$CuPc\ [SO_2NH(CH_2)_3N(CH_3)_2]_{2\ to\ 3}[SO_3H]_{1\ to\ 2} \qquad (1),$$

in which CuPc represents copper phthalocyanine, or the alkali metal salt of (1),
b) 5 to 15% by weight of $\epsilon$-caprolactam,
c) 1 to 8% by weight of formic acid,
d) 1 to 7% by weight of benzyl alcohol,
e) 0 to 3% by weight of a lower aliphatic organic acid,
f) 0 to 5% by weight of an inorganic salt and
g) water, to complete to 100% by weight.

Preferably, the liquid preparation comprises 20 to 30% by weight of the dye of the formula (1), which may be present either in the form of the free sulphonic acid or the lithium, potassium or especially the sodium salt.

The amount of $\epsilon$-caprolactam present in the formulation preferably lies between 8 and 12% by weight, whilst the formic acid is preferably present in an amount of between 2 and 5% by weight and the benzyl alcohol content preferably lies between 4 and 6% by weight, based on the total weight of the liquid preparation.

Optionally, the liquid preparation may contain a further lower aliphatic organic acid other than formic acid, which may, for example, be selected from propionic acid, lactic acid, malic acid, glycolic acid, citric acid, methane sulphonic acid or, especially acetic acid, whereby said lower aliphatic acid preferably constitutes 0 to 1% by weight, based on the total weight of the liquid preparation.

Similarly, the liquid preparation may contain inorganic salts such as, for example, sulphates, hydrogen sulphates or chlorides of alkali metals such as lithium, potassium or sodium, in particular, sodium chloride, which salts are preferably present in an amount of between 0.5 and 3% by weight, based on the total weight of the liquid preparation. However, especially long-term storage stability of the formulations is increased if, prior to formulation, the dye press cake is washed with a dilute aqueous solution of an inorganic buffer of pH 7-10, in order to render the press-cake salt free.

A further aspect of the invention is a process for the preparation of a liquid preparation as described above, which process comprises mixing the components a) to g), as previously defined, in any desired or convenient order, until solution results.

In a further aspect, the invention relates to a process for the dyeing of paper, by treating the paper with a liquid composition as defined previously. The liquid preparation is used, optionally after dilution with water, for the dyeing of paper, semi-cardboard or cardboard, whereby these materials can be dyed, for example, in the pulp, by brushing or immersion or by applying to the paper surface by coating or spraying or for application in a continuous dyeing process, whereby the paper, semi-cardboard or cardboard which has been dyed with the liquid composition of the invention constitutes a still further aspect of the invention.

The following examples serve to illustrate the invention, without intending to be restrictive in nature. Parts and percentages are by weight unless otherwise stated.

EXAMPLE 1

A mixture comprising 100 parts of $\epsilon$-caprolactam, 50 parts of benzyl alcohol and 50 parts of formic acid in 200 parts of water is heated to 40° C. To this mixture are then added 600 parts of a moist, unwashed filter-cake which was precipitated at pH 9.0 and which contains 37.5% active substance of the dye of formula

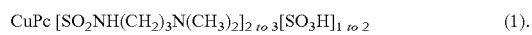

$$CuPc\ [SO_2NH(CH_2)_3N(CH_3)_2]_{2\ to\ 3}[SO_3H]_{1\ to\ 2} \qquad (1).$$

After stirring for 2 hours, the mixture is cooled to room temperature and filtered. There is obtained a dye formulation containing 22.5% of the dye of formula (1), 10% $\epsilon$-caprolactam, 5% benzyl alcohol and 5% formic acid. The viscosity of the solution at 5° C. is 105 mPa·s and the salt content 1.4% sodium chloride.

The formulation is stable within the temperature range of from −15 to +50° C. over a period of several months, is miscible with water in all proportions and is suitable for dyeing paper.

EXAMPLE 2

An analogous formulation with a salt content of 2.4% sodium chloride is similarly storage stable and exhibits a viscosity of 110 mPa·s at 5° C.

EXAMPLES 3-7

By proceeding as described in Example 1, but varying the amounts of $\epsilon$-caprolactam, benzyl alcohol and formic acid, stable formulations containing 22.5% of the dye of formula (1) may be similarly obtained, as summarized in the following Table 1:

TABLE 1

| Example no. | ε-caprolactam | Formic acid | Benzyl alcohol |
|---|---|---|---|
| 3 | 10% | 3% | 5% |
| 4 | 10% | 4% | 5% |
| 5 | 5% | 5% | 5% |
| 6 | 5% | 4% | 5% |
| 7 | 10% | 5% | 3% |

Long-term storage stability is increased if, in the above Examples, a salt free press-cake, obtained by washing with 0.75% aqueous sodium carbonate buffer solution of pH 9.0, is employed.

The invention claimed is:

1. A liquid preparation of a paper dye comprising
a) 15 to 20% by weight of the dye of the formula

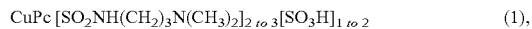

$$\text{CuPc}[SO_2NH(CH_2)_3N(CH_3)_2]_{2\ to\ 3}[SO_3H]_{1\ to\ 2} \qquad (1),$$

in which
CuPc represents copper phthalocyanine, or the alkali metal salt of (1),
b) 8 to 12% by weight of ε-caprolactam,
c) 2 to 5% by weight of formic acid,
d) 4 to 6% by weight of benzyl alcohol,
e) 0 to 3% by weight of a lower aliphatic organic acid,
f) 0 to 5% by weight of an inorganic salt and
g) water, to complete to 100% by weight.

2. A liquid preparation of a paper dye according to claim 1, comprising 0 to 1% by weight of a lower aliphatic organic acid.

3. A liquid preparation of a paper dye according to claim 1, comprising 0.5 to 3% by weight of an inorganic salt.

4. A process for the preparation of a liquid dye preparation according to claim 1 comprising mixing the components a) to g) together.

5. A method of dyeing paper comprising contacting in the pulp or applying to a paper surface the liquid paper dye preparation according to claim 1.

* * * * *